Sept. 13, 1966 R. W. COOK 3,273,054
PIPE JOINT LOCATOR COMPRISING MOBILE TRANSFORMER
UTILIZING THE PIPE AS LOW RELUCTANCE
PATH BETWEEN PRIMARY AND SECONDARY
Filed Nov. 16, 1961 2 Sheets-Sheet 1

INVENTOR.
ROBERT W. COOK
BY
Lockwood, Woodard, Smith & Weikart
Attorneys

INVENTOR.
ROBERT W. COOK

United States Patent Office 3,273,054
Patented Sept. 13, 1966

3,273,054
PIPE JOINT LOCATOR COMPRISING MOBILE TRANSFORMER UTILIZING THE PIPE AS LOW RELUCTANCE PATH BETWEEN PRIMARY AND SECONDARY
Robert W. Cook, Decatur, Ind., assignor to C. W. Fuelling, Inc., Fort Wayne, Ind., a corporation of Indiana
Filed Nov. 16, 1961, Ser. No. 152,736
4 Claims. (Cl. 324—37)

This invention relates generally to a method and apparatus of sealing joints in underground pipelines, and more particularly to a device for accurately locating joints in the pipeline to be sealed.

It is well known in the art of gas and liquid distribution, that where there is increased consumption but not a corresponding increase in distribution mains, an increase of operating pressure in existing mains is the expedient used to meet the increased demand. This is true in gas distribution, for example. With increased gas usage, and the transmission of gas at increased pressures, the underground network of pipes or mains for distributing such gas has been overtaxed inasmuch as the present operating conditions were not considered in the original design thereof. As a result of this, and also because of age, existing gas transmission networks have presented leakage problems, which frequently have created dangerous situations in various localities.

In order to overcome the aforesaid leakage problems without undertaking the formidable task of making innumerable excavations at each of the joints in the gas transmission main, and/or even the replacement of entire sections of pipes because of leaks therein, an apparatus and method have been developed for sealing underground gas mains. Such a pipe sealing apparatus and method are disclosed and claimed in the Cook et al. Patent No. 2,894,539, entitled, "Pipe Sealing Apparatus and Method," which issued on July 14, 1959, the disclosure of which is incorporated herein by reference insofar as is necessary. In order to locate the pipe joints to be sealed, a device has been provided as disclosed and claimed in the Cook Patent No. 2,896,155, entitled, "Pipe Joint Locating Device," which issued July 21, 1959, the disclosure of which is incorporated herein by reference insofar as necessary.

It has been found in the use of the aforementioned device for locating pipe joints, that as the diameter of the pipe in which the device is used is increased, the joint-locating capacity is decreased. The result is that there is a practical limit in diameter of pipe with which the aforementioned device is very successful. As the diameter increased, the magnetic lines of force which are radiated into the pipe wall become less concentrated because of the greater distance from the source of the magnetic field to the top of the pipe, and because the lines of force introduced into the pipe adjacent to the source of the magnetic field dissipate themselves in the greater mass of metal in a larger pipe. This fact causes the voltage induced in the secondary inductor or "pick-up" coil from the magnetic field in the pipe to be decreased and consequently the voltage variation upon interception of the joint is decreased.

This comparatively small variation led to the possibility of the individuals reading the indicating meters to interpret slight vertical movements of the locator as joints or to entirely miss their location.

It is, therefore, a general object of this invention to provide an improved pipeline joint-locating device.

It is a further object of this invention to provide improved locating device for use inside of pipes made of a magnetic material.

It is a further object of this invention to provide a pipe joint-locating device capable of producing a substantial signal to indicate the location of a pipe joint when used in pipe having a large diameter and a large mass.

It is a still further object of this invention to produce a device of the foregoing charcater which is stable in all senses transversely of the pipe and readily movable longitudinally of the pipe.

It is a still further object of this invention to provide a device having the foregoing characteristics and yet occupying a minimum of space.

Described briefly, a typical embodiment of the present invention includes a pair of inductors, each having a core with a coil mounted thereon, with a non-magnetic frame securing the inductors in a mutually inductive relationship. Wheels of magnetic material are mounted through antifriction bearings of magnetic materials to the ends of the cores to provide extremely low reluctance paths from the cores to the pipe in which the device is supported by the wheels. Suitable electrical leads are provided from the inductors through a cable to a plug-in unit to be mounted to the joint sealing apparatus.

The full nature of the invention will be understood from the accompanying drawings and the following description and the claims:

Figure 6:
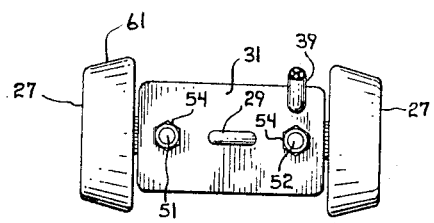

FIG. 6. is a front elevation thereof.

Figure 7:
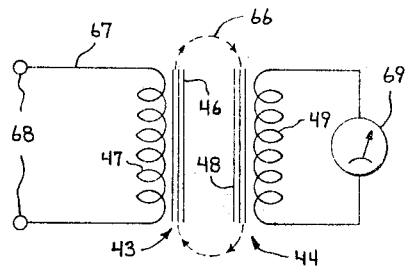

FIG. 7 is a schematic circuit diagram of the device in use.

Figure 1:
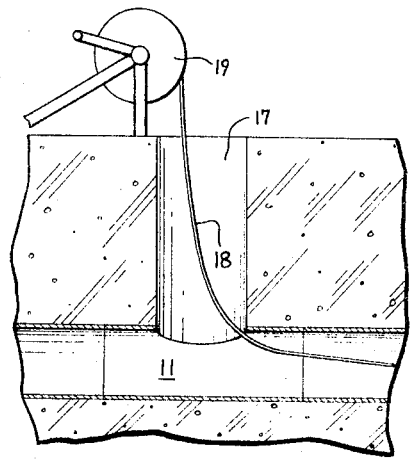
FIG. 1 is a schematic illustration of the use of the pipe sealing apparatus in an underground main.
Figure 1:
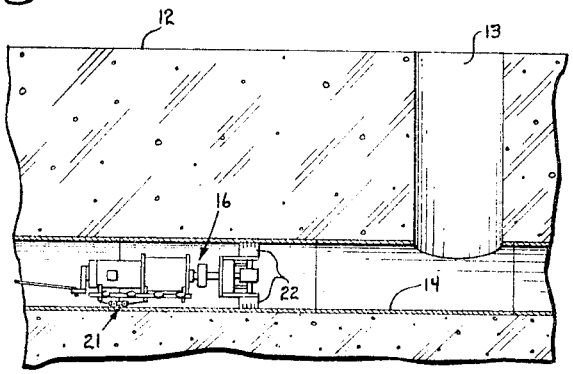

Referring to FIG. 1, pipeline 11 is shown well below the surface 12 of the ground. A suitable excavation 13 is made to provide access to a pipe section 14. This excavation is made large enough so that the pipe sealing apparatus 16 may be inserted into the pipeline therethrough.

A second excavation 17 is provided through which the cable 18 may be passed to connect to the front of the sealing apparatus 16 for drawing through the pipeline by means of the winch 19. Suitable provision may be made within the cable 18 or thereabout to provide for electrical circuits from the sealing apparatus and joint-locating device to the surface of the ground and also for an air supply to the sealing apparatus. As the apparatus is drawn through the pipeline, the joints are located and sealed and the apparatus may then be withdrawn at the excavation 17. It should also be understood, that a single excavation may be provided and the apparatus moved by the use of telescoping or detachable rod sections a considerable distance, five-hundred feet for example, down the pipe in one direction from the excavation, and then drawn back to the excavation, locating and sealing joints along the way. The apparatus may then be turned around in the pipe and extended in opposite direction and returned in like manner. As the apparatus is pulled along, the joint-locating device 21 locates a joint. The apparatus is then advanced the known distance between the locating device and the sealant application blades 22 whereupon they are disposed at the joint. The blades are then extended and rotated as described in the aforementioned patent to Cook et al. whereupon the joint is sealed. The apparatus is then moved to the next joint where the same sequence of events takes place.

Figure 2:
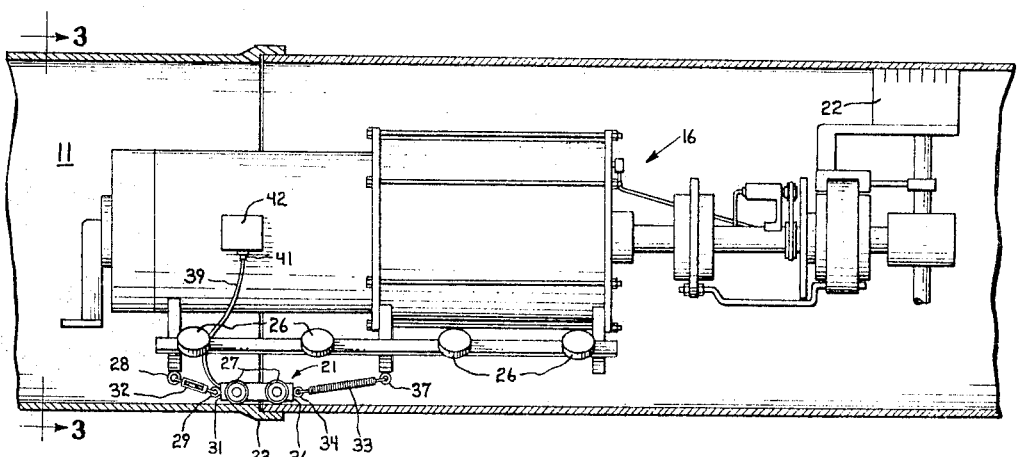
FIG. 2 is an enlarged view of the pipe sealing apparatus in a main and illustrating the disposition of the pipe joint-locating device according to this invention.
Figure 3:
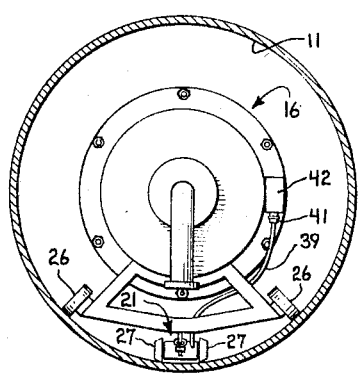
FIG. 3 is a section through the apparatus taken along the line 3—3 in FIG. 2, with internal details of the sealing apparatus itself omitted.

Referring to FIG. 2, apparatus 16 is shown in the pipe with the locating device 21 straddling the joint 23. The sealing apparatus is carried on longitudinal frame members borne by the wheels 26. The orientation of the frame members and wheels can be better appreciated by reference to FIG. 3. Locating device 21 is supported in the pipe by its wheels 27. An anchor hook 28 is securely mounted to the sealing apparatus. A screw eye 29 is provided on the front bulkhead 31 of the locating device. A turnbuckle 32 is coupled to the anchor 28 and the screw eye 29 to provide means for drawing the locating device along the pipe with the sealing apparatus.

A trailing linkage for the joint-locating device is provided by means of the spring 33 connected to the screw eye 34 in the rear bulkhead 36 of the joint-locating device. The opposite end of the spring 33 is connected through the loop 37 mounted on the sealing apparatus. Accordingly, by means of the turnbuckle, the position of the locating device longitudinally with respect to the applicator blades 22 can be adjusted. Also, the tension applied between the ends of the locating device, can be varied whereby its freedom of movement laterally on the surface of the pipe can be controlled. An electrical coupling from the locating device to the cable 18 may be provided by the cable 39 attached to the locating device and fastened by the connector 41 to the junction box 42.

Figure 4:
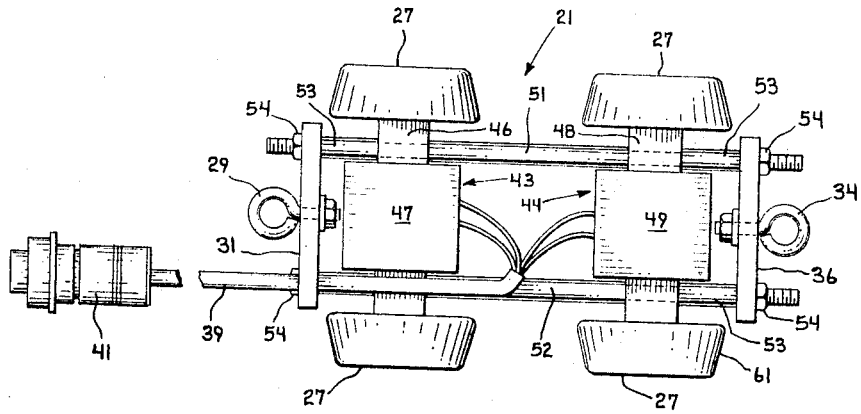
FIG. 4 is a top plan view of the pipe joint-locating device according to this invention.
Figure 5:
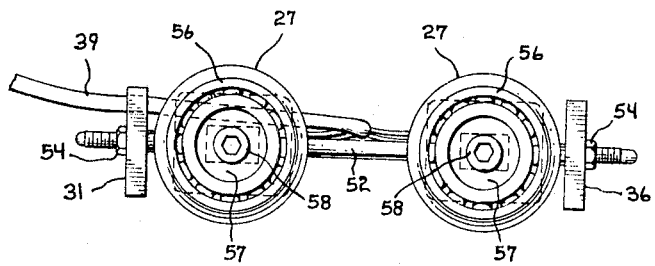
FIG. 5 is a side elevation thereof.

Referring to FIGS. 4, 5 and 6, the locating device is shown with the external shroud removed. It includes a primary inductor 43 and a secondary inductor 44. The primary inductor includes a core 46 with a coil 47 mounted thereon. The secondary inductor includes a core 48 with a coil 49 mounted thereon. The core members are, of course, made of a magnetic material. They are mounted to the longitudinally extending non-magnetic frame members 51 and 52. The frame members are typically shafts having step down diameters passing through the cores and threaded at their opposite ends. The central portions of the frame members thereby provide shoulders against which the cores are located whereby they are appropriately spaced apart to provide sufficiently high air path reluctance between the coils. The cores are secured on the frame members by sleeves 53 which are of greater diameter than the holes through the cores and also of greater diameter than the holes through the bulkheads 31 and 36, whereby advancing of the nuts 54 secures them in place.

The wheels 27 as illustrated in the present embodiment, are in the form of ball bearings wherein the outer race 56 corresponds to the tire, and the inner race 57 corresponds to the hub. The inner race 57 is mounted to the core 46 of the corresponding inductor by means of the socket head machine screw 58. The surface 61 of the tire is shown to taper toward a point outboard of the locating device.

The entire wheel assembly including the inner race, the balls and the outer race or tire, is made of a magnetic material as is the screw 58. This fact and the fact that the tires are tapered as shown, provide an extremely low reluctance path from the respective core to the pipe in which the locating device is disposed. Accordingly, though the size and mass of the pipe in which the device is used may be large, the magnetic coupling between the inductors through the pipe at locations other than where a joint exists, is very good. Therefore, the magnetic coupling change which occurs when a joint is straddled as shown in FIG. 2, is substantial and provides a reliable indication of the presence of the joint. To illustrate the improvement in performance which has been obtained according to the present invention, particularly for pipes of larger diameters, the following table is an example. In this table, the voltage applied to the primary inductor coil was 100 volts A.C. The values shown in the table are in volts, A.C., measured across the secondary inductor coil.

|  | Off Joint | On Joint | Difference |
|---|---|---|---|
| 6″ pipe with wheels removed | 1.22 | .94 | .28 |
| 6″ pipe with wheels attached | 1.90 | 1.18 | .72 |
| 24″ pipe with wheels removed | 1.32 | 1.23 | .09 |
| 24″ pipe with wheels attached | 1.78 | 1.33 | .45 |

From the foregoing example, it is evident that the present invention provides a remarkable improvement in performance over prior practice, even when used in the smaller pipe. The improvement obtained in large pipe is remarkable, and as sealing equipment for pipes of thirty-six-inch diameter and larger becomes available, the value of the present invention will be multiplied manifoldly.

Referring to FIG. 7, the magnetic coupling of the inductors 43 and 44 is indicated by the flux lines 66 between the cores 46 and 48. Alternating current input to the primary inductor 43 through the wires 67 is provided from the input terminals 68. Measurement of electrical energy induced in the secondary inductor 44 is represented by the meter 69 connected across the coil 49. Traverse of a joint by the locating device causes a change in the reluctance of the available path for coupling the two inductors magnetically whereupon a corresponding change in the meter reading will be produced.

The contribution to the art provided by the present invention can readily be appreciated when it is recognized that the reasons for difficulties experienced in applying previous devices to the joint-locating task, particularly in larger pipes, were not heretofore recognized. The most logical approaches to meeting the problems were tried without success. These included variations in coil structure, spacing, and core variations. The present invention provided the solutions without necessitating an increase of size of the locating device, increase of energy applied to the primary inductor, employment of different frequencies, or use of more sensitive meters. Instead, performance was radically improved, simplicity maintained, and cost minimized.

The foregoing description mentions the use of ball bearings. These are, of course, usually made of steel. It should be recognized, however, that other types of wheels with, or without, anti-friction bearings and magnetic materials other than the ferrous materials may also be used. Low reluctance means other than wheels shown could be mounted to the core end providing support for the cores and the locating device as a whole without departing from the scope of the invention. The present invention can, of course, be used independently of the sealing apparatus if desired.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed:
1. A pipeline joint-locating device comprising:
   primary and secondary inductors, said primary inductor having a first elongated core of ferromagnetic material and a first coil mounted thereon, and said secondary inductor having a second elongated core of ferromagnetic material and a second coil mounted thereon;

a mobile frame supporting said inductors in mutually inductive spaced relation, the spacing of said inductors being predetermined to provide a high reluctance field between said inductors;

four ferromagnetic wheels mounted to said cores, said wheels being disposesd with their axes of rotation lying in two horizontally spaced planes, said planes being parallel to said cores and said wheels being spaced from each other for stably supporting said device and its frame in a horizontal pipe of ferromagnetic material to provide a low reluctance path between said inductors through the pipe.

2. A pipeline joint-locating device comprising:

primary and secondary inductors, each inductor having an elongated core of ferromagnetic material and a coil mounted thereon the core and coil of the primary inductor being separate from the core and coil of secondary inductor;

a mobile frame supporting said inductors in mutually inductive spaced relation, the spacing of said inductors being predetermined to provide a high reluctance field between said inductors;

four ferromagnetic wheels mounted through ferromagnetic anti-friction bearings to the ends of said cores, each of said wheels being mounted to a core end different from the core ends to which the other of said wheels are mounted, the rotational axis of each wheel lying in a vertical plane which is parallel to the core to which said wheel is mounted, whereby said wheels are spaced to provide stable support for said device in a horizontal pipe of ferromagnetic material to provide a low reluctance path between said inductors through the pipe.

3. In a pipeline joint-locating device, first and second mecanically distinct inductor means, each having an elongated core of ferromagnetic material, and four ferromagnetic wheels mounted to said cores, the rotational axes of said wheels being in horizontally spaced planes parallel to said cores and said wheels being spaced from each other to provide stable support for said inductor means in a horizontal pipe of ferromagnetic material to provide a low reluctance path between said core and the pipe.

4. In a pipe line joint-locating device, an inductor means having a core of ferromagnetic material, and a coil mounted thereon, and ferromagnetic wheels mounted to the ends of said core for supporting said inductor in a pipe of ferromagnetic material, said wheels having ferromagnetic tires thereon with outer surfaces generally tapering toward points outboard of the device, to provide a low reluctance path between ends of said core through a circular portion of the pipe.

References Cited by the Examiner

UNITED STATES PATENTS

| | | | |
|---|---|---|---|
| 1,366,979 | 2/1921 | Ullrich | 324—34 |
| 1,807,411 | 5/1931 | Imes | 324—34 |
| 2,194,229 | 3/1940 | Johnston et al. | 324—37 |
| 2,311,715 | 2/1943 | Thorne | 324—37 |
| 2,447,911 | 8/1948 | Mages et al. | 324—34 |

WALTER L. CARLSON, *Primary Examiner.*

F. A. SEEMAR, R. J. CORCORAN, *Assistant Examiners.*